Wells W. Wells-Coates
Inventor
by his attorneys
Stebbins, Blenko & Webb

July 17, 1951 W. W. WELLS-COATES 2,561,253
SAILING CRAFT

Filed Dec. 4, 1946 10 Sheets-Sheet 3

Wells W. Wells-Coates
Inventor
by his attorneys
Stebbins, Blenko & Webb

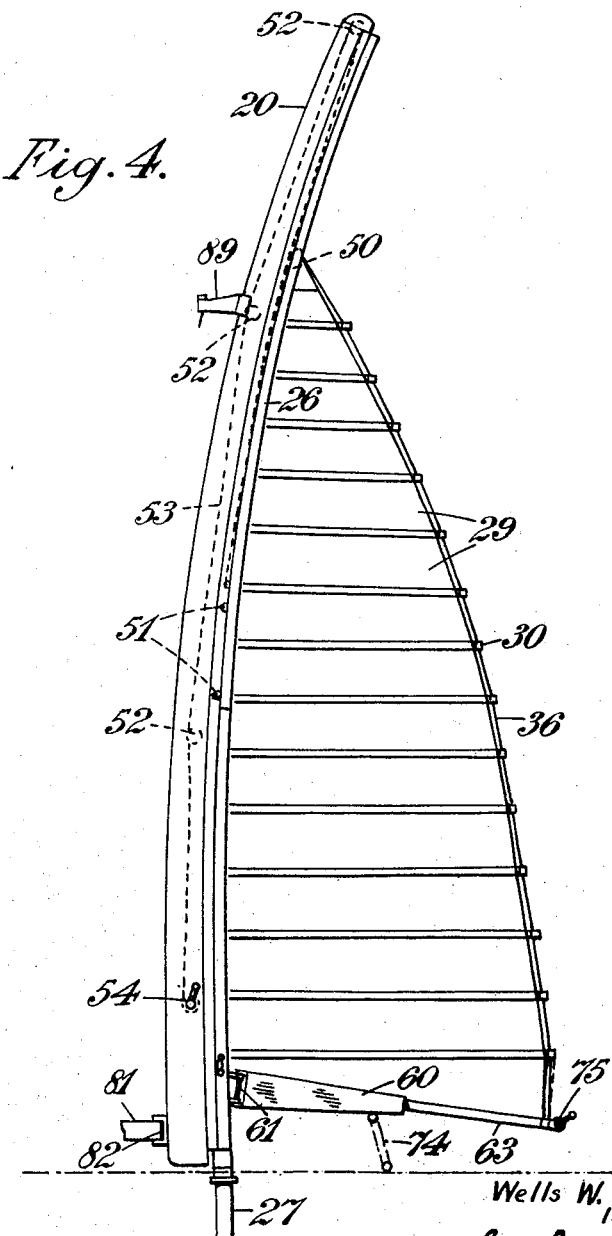

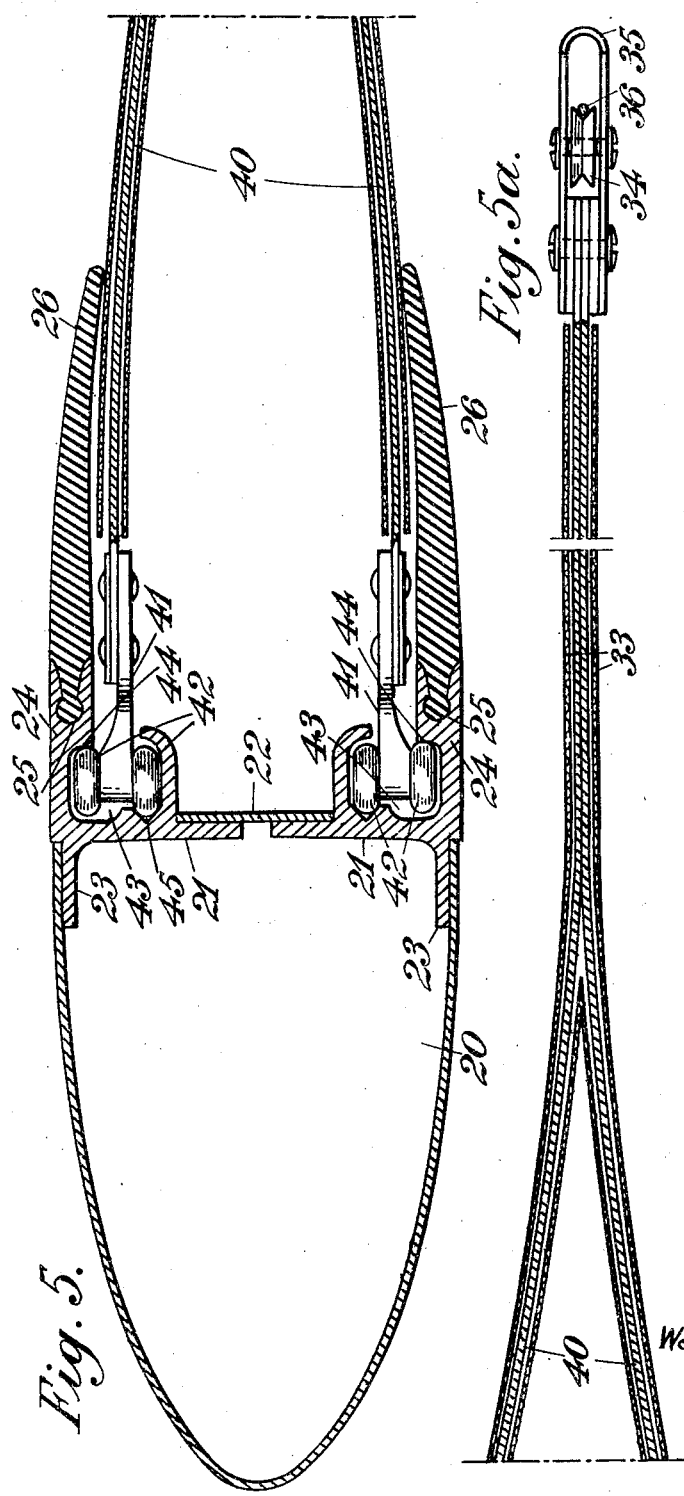

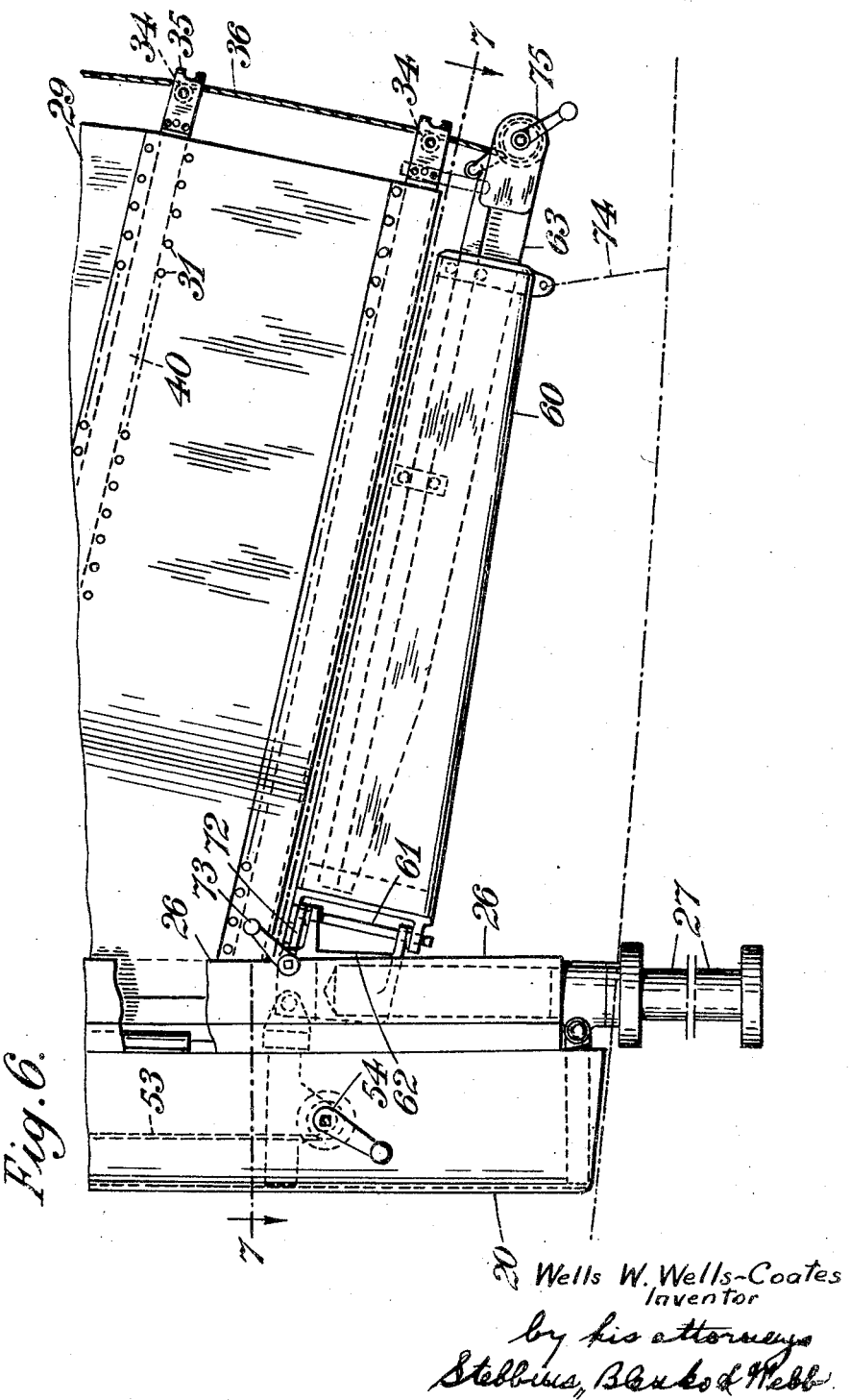

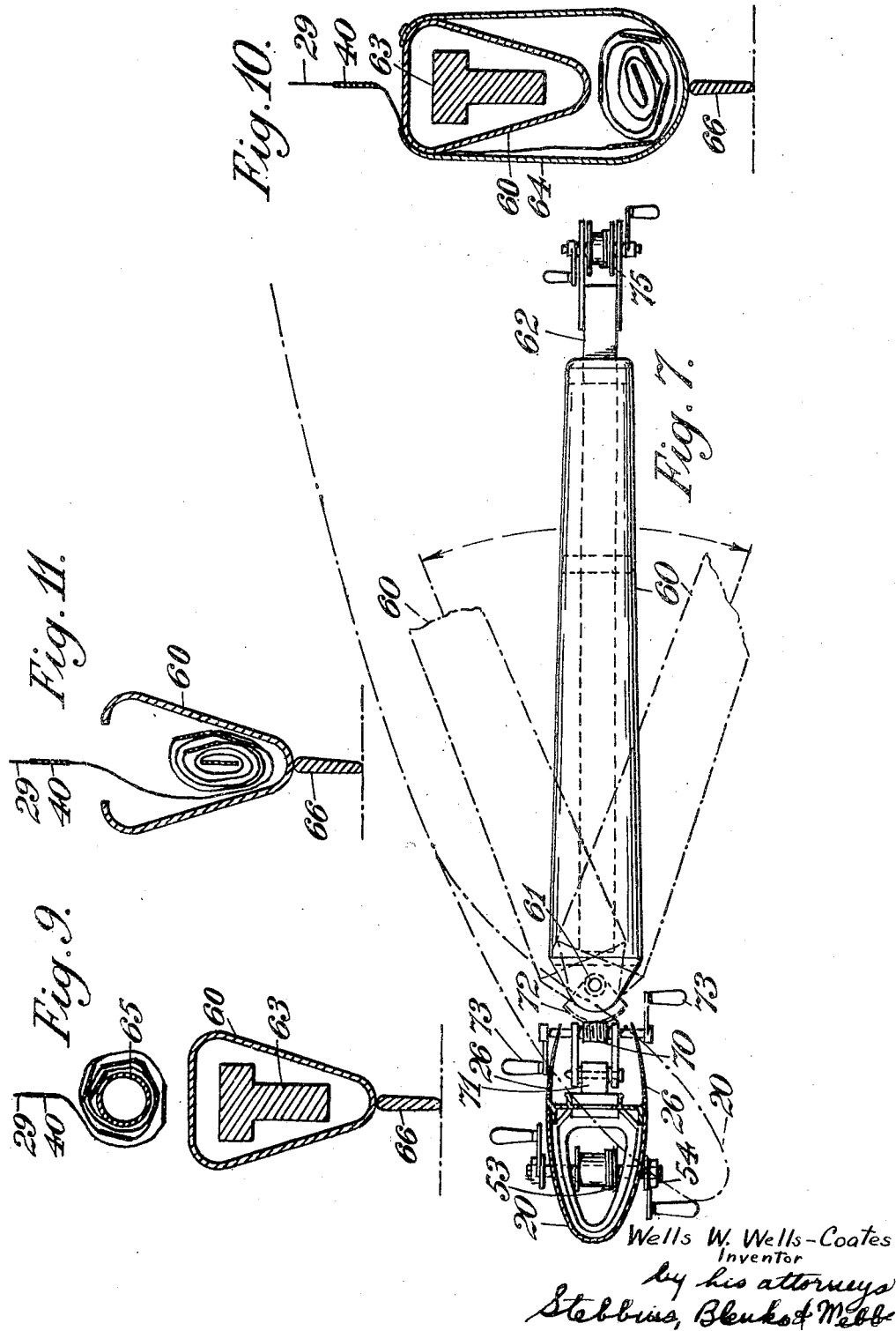

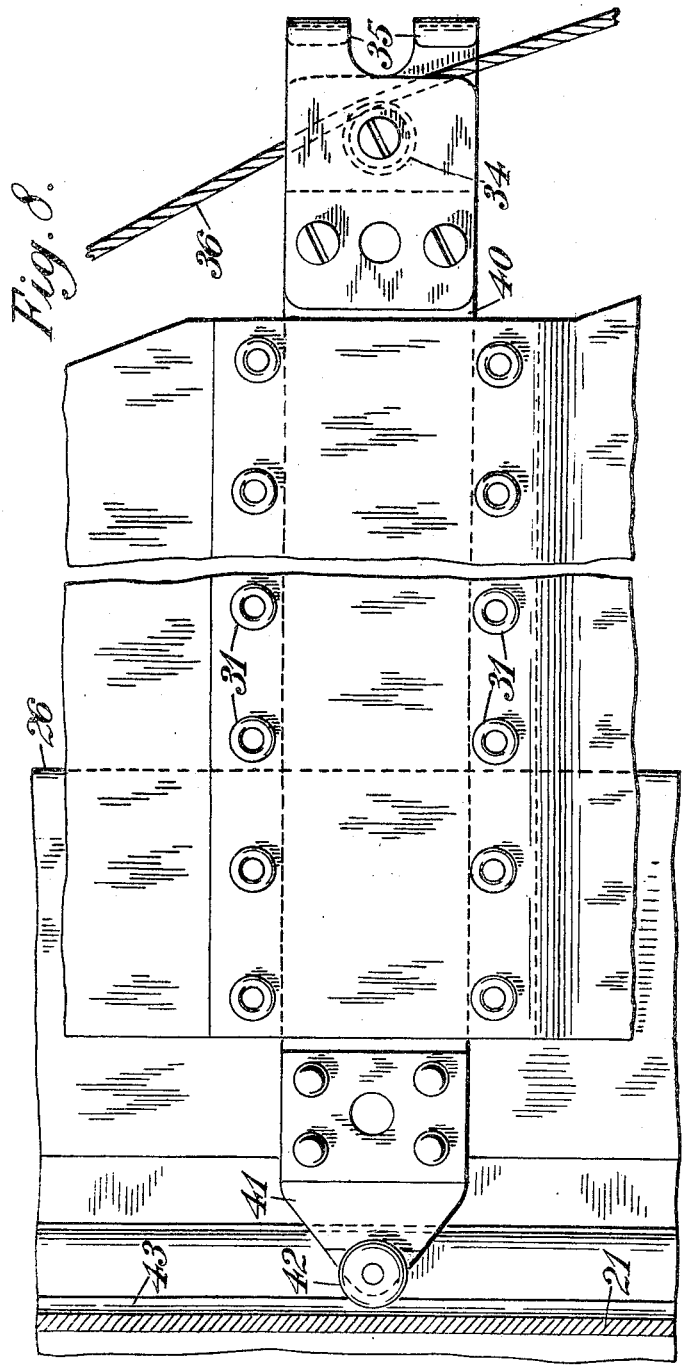

July 17, 1951  W. W. WELLS-COATES  2,561,253
SAILING CRAFT
Filed Dec. 4, 1946  10 Sheets-Sheet 9

Wells W. Wells-Coates
Inventor
by his attorneys
Stebbins, Blenko & Webb

July 17, 1951 W. W. WELLS-COATES 2,561,253
SAILING CRAFT
Filed Dec. 4, 1946 10 Sheets-Sheet 10
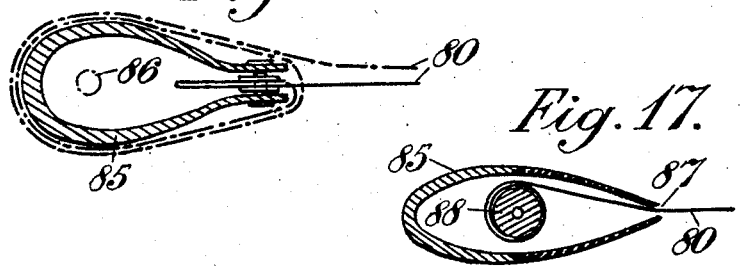
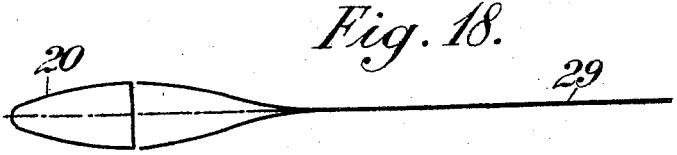
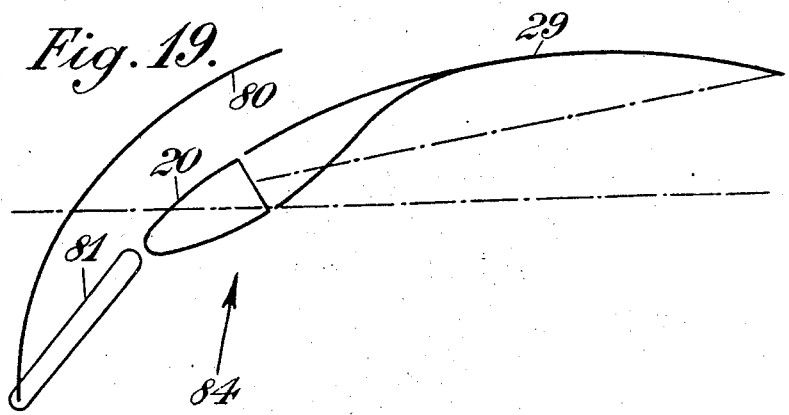
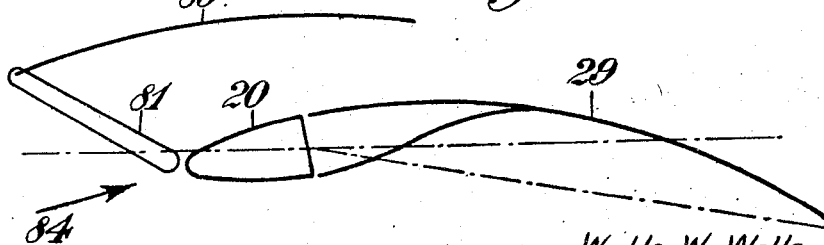
Wells W. Wells-Coates
Inventor
by his attorneys
Stebbins, Blenko & Webb Patented July 17, 1951

2,561,253

UNITED STATES PATENT OFFICE 2,561,253

SAILING CRAFT

Wells Wintemute Wells-Coates, London, England

Application December 4, 1946, Serial No. 714,055
In Great Britain May 17, 1946

10 Claims. (Cl. 114—102)

This invention consists in improvements in or relating to sailing craft and has for one object to provide a rig by which much of the inefficiency of hitherto known rigs will be eliminated under the many changes of sail aspect with relation to the wind direction which must be encountered when numerous changes of course are necessary as, for example, under racing conditions.

This main object is obtained largely by improved means for controlling and maintaining rigidly the arch or curvature of the sail by adjusting means which will ensure a smooth flow of wind over the sail surface with the minimum of turbulence.

Broadly, the present invention comprises in combination, a revolving mast of aerofoil or streamline cross section and a stiff sail having a plurality of full length or substantial full length battens extending from the leech to or towards the luff of the sail, with means to adjust the flexure of the battens in order positively to control and maintain rigidly the arch of the sail. Preferably the mast is combined with means which will close any gap which might otherwise exist between the mast and the luff of the sail. Such means may be in the form of flaps or ailerons hinged to the mast on both sides of the sail with their free edges extending aft where they will engage the sail surfaces.

As a further aid to the prevention of waste of wind pressure and turbulences of the wind at the surface of the sail, a foot flap or flaps are preferably provided to close also any space that might otherwise occur between the foot of the sail and the deck.

The invention also includes a sail when it is stiffened by a series of parallel battens running more or less fore and aft of the sail and arranged at intervals in the height thereof. Each of such battens is, at its forward end, constructed in Y formation so that it terminates at the mast end in two divergent arms at the extremities of which are mounted rollers intended to travel in mast tracks.

The sail is intended to be used in conjunction with a mast which is mounted so as to swivel about its general vertical axis, and the mast itself is preferably curved aft in a smooth and comparatively slight curvature, the mast tracks on which the batten rollers run, following the line of such curvature.

The mast is conveniently formed of two longitudinal members each of which provides one of the tracks or a pair of tracks for one of the roller sets, and these two longitudinal members are braced by a connecting web. Forward of this structure the mast is furnished with an envelope of streamline section and the rearward edges of each of the longitudinal members is formed with a key-hole section slot in which are inserted correspondingly moulded portions of two plates formed of resilient material and extending substantially the full height of the mast. Each of the plates is of a width to cover well over the divergent forward edge of the sail, and the plates serve jointly to close what is ordinarily a gap between the luff of the sail and the mast.

The sail cloths from which the sail is built up are formed in relatively narrow widths fastening round the battens in a manner which will hereafter be more fully described, and each width is also formed with a V flare to correspond with divergent ends of the battens.

The fore-and-aft width of the sail is greater midway of its height than at its lower or its upper extremities. It is convenient to employ a telescopic boom to which the outer end of the lowermost batten in use can be connected by means of a strop. With the sail fully extended the telescopic boom will be closed up to some extent, whereas when the sail is reefed down, a relatively wider batten will be the lowermost one in use and consequently the boom will be extended.

Means, which will be described more fully hereinafter, are provided for the stowage of the reefed portion of the sail and also for stowage when the sail is fully lowered.

The foregoing and other features of the invention will be more clearly understood from the following description of some preferred forms of the example read in conjunction with the accompanying drawings, in which:

Figure 4 illustrates the sail shown in Figure 3 in reefed condition;

Figures 5 and 5a are together a section on the line 5—5 of Figure 1 but on a considerably enlarged scale;

Figure 6 is an elevation on an enlarged scale of the boom and lower portion of the mast shown in Figures 1 to 4;

Figure 7 is a section on the line 7—7 of Figure 6;

Figure 12:
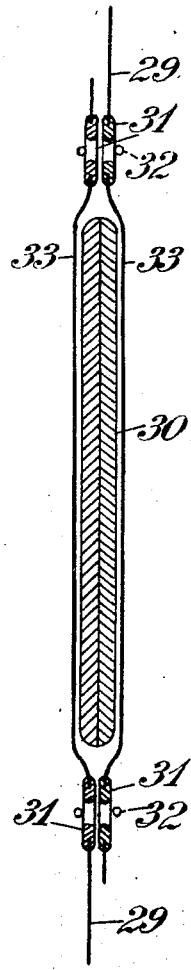
Figure 13:
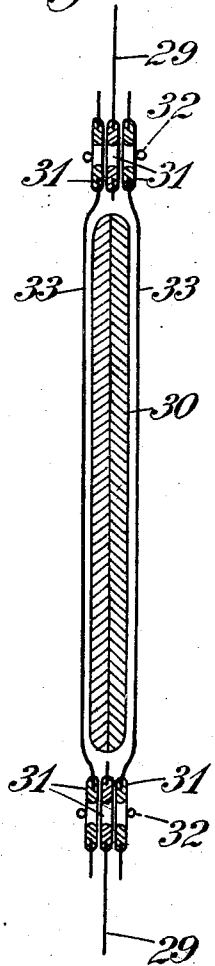
Figure 14:
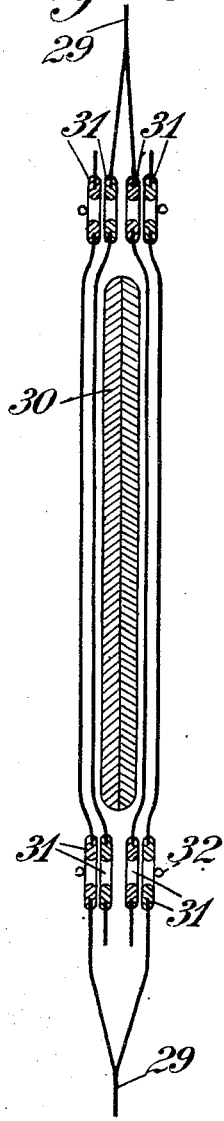
Figure 15:
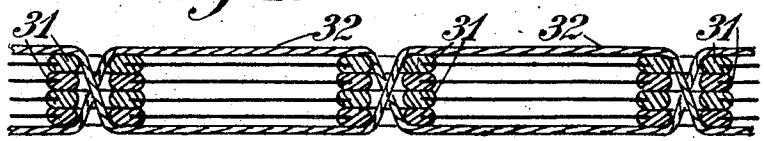

Figure 8, also on an enlarged scale, illustrates in detail the attachment of the sail cloth to one of the battens;

Figures 9, 10 and 11 illustrate diagrammatically different methods of stowing the sail or a reefed portion thereof;

Figures 12, 13 and 14 diagrammatically represent various methods of overlapping the sail cloths;

Figure 15 is an enlarged sectional view illustrating a method of lacing the sail cloths together in the form illustrated in Figure 14;

Figures 16 and 17 diagrammatically represent in section two different methods of supporting a roller foresail, and Figures 18 to 20 are diagrammatic representations of some essential relationships between the main sail, mast and foresail.

Like reference numerals indicate like parts in the various figures of the drawings.

The accompanying drawings illustrate a preferred rig including all the improvements coming within the scope of the present invention, and these will now be described in detail and for the sake of convenience under a number of detailed headings.

*Mast.*—The mast 20 as shown clearly in the section in Figure 5 is of streamline cross section and may be constructed from any one or a combination of a number of different materials such for instance as Dural sheet or low pressure laminated skins with transverse formers and vertical members in light alloy, or of other desired materials of a seaworthy nature, the covering being preferably applied on the stressed skin principle. In the example illustrated the leading edge fairing is preferably a hollow member shaped to the required streamline form and braced by two longitudinal members 21 which latter are interconnected and are braced by an interconnecting web 22. The hollow envelope of streamline form is attached forward of the longitudinal members 21 and its edges are received in rebates formed in forwardly projecting flanges 23 on the members 21.

Extending rearwardly from the members 21 are other side flanges 24 each formed throughout its length with a slot 25 of key-hole section in which are inserted correspondingly moulded edges of two plates 26 formed of resilient material. The plates 26 may be moulded from rubber composition or other preferred material having the necessary resilience and extend substantially the full height of the mast. The hollow forward section flanges 24 and plates 26 constitute as a whole a streamlined structure and the plates 26 serve to close any gap which in the more usual rigs in use exists between the luff of the sail and the mast. The plates 26 also enclose the inner ends of the sail battens which will be described more fully hereinafter.

As shown diagrammatically in Figures 1 to 4 the mast is stepped on a rotary shaft 27 which extends below the deck and allows the mast to revolve freely through approximately 180°. The mast however may be stepped at the deck level but whatever arrangement is used for this purpose the mast itself is mounted so that it can revolve about its longitudinal axis.

As an alternative to the flexible plates 26 flaps hinged to the mast could be substituted and in whatever form they are provided they will serve to close any gap which might otherwise exist between the mast and the luff of the sail and will partake of the streamline form of the mast.

The mast is of a vertical cantilever design which renders unnecessary the usual rigging stays, shrouds, struts and the like which create unnecessary windage or drag and thus affect the overall efficiency of the rig. In large rigs, say with masts over 36 ft. in overall height, it may be necessary to introduce two stays or shrouds leading up to the foresail head-sprit on the mast at the point immediately above the centre line of rotation of the mast. In this form of rig a slightly lighter mast section may be employed with a consequent saving in weight.

Figure 1:
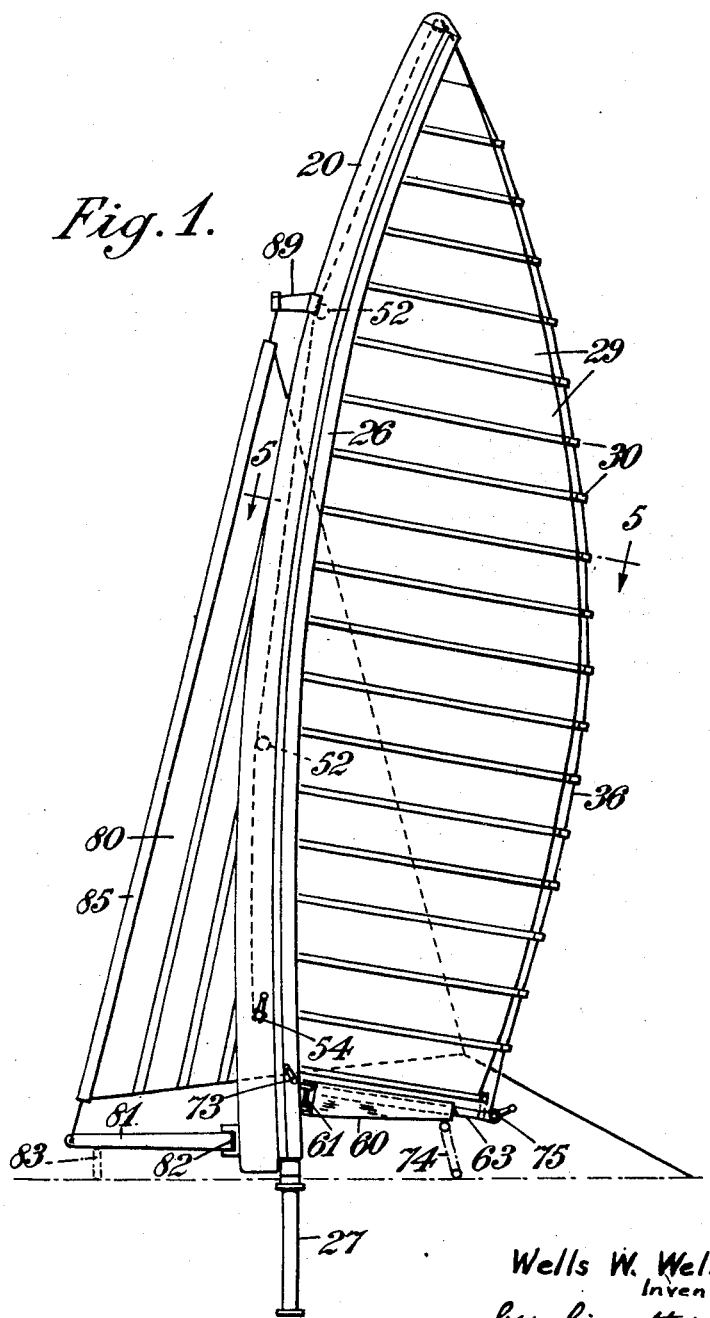
Figure 1 illustrates the side view of a mast, main sail and foresail in accordance with this invention.

*Sail.*—The main sail is a triangular sail specially shaped as shown in Figures 1 to 4 and is such that its maximum fore and aft dimension occurs intermediate the upper and lower ends of the sail, this shaping being clearly shown in Figure 1.

The sail is formed from a number of separate sail cloths 29 of relatively narrow widths considered in the vertical direction of the sail and the edges of these sail cloths are formed so that the meeting edges of adjacent sail cloths can be secured round battens 30. Figures 12 to 14 illustrate some forms in which these edges, which extend fore and aft, can be formed and interconnected. As shown in Figure 12 each cloth near its edge is provided with two spaced lines of eyelets 31 such that the edges will be passed around opposite sides of the batten 30 when the two lines of eyelets will be in register with one another and the cloths are then secured together and round the battens by lacing 32.

Figure 13 illustrates a modification in which the actual edges of the sail cloths 29 do not pass round the battens 30. The edges however are provided with a line of eyelets 31 and two canvas side sheets 33, also provided with lines of eyelets to register with those in the two sail cloths are attached on either side of batten 30 and are laced to the edges of cloths 29.

In Figure 14 a further modification is shown in which each sail cloth 29 is woven with a Y section or split selvedge and both limbs of each selvedge are provided with lines of eyelets 31. Thus the selvedge edges of one cloth may be passed round the batten 30 in one direction and the similar edges of the adjacent cloth are passed round the batten on the outside of the selvedges of the companion cloth and the four sets of eyelets on both sides of the batten are then laced together.

Figure 15 illustrates one manner in which the lacing can be effected.

By constructing a sail in this manner each batten is totally enclosed by the sail cloths at their longitudinal interconnections and, as shown in Figures 1 to 4, the battens (and the sail cloth junctions) preferably extend fore and aft with a slight downward rake from the luff towards the leech of the sail.

Although lacing has been described as the means for interconnecting the sail cloths, bolts and nuts may be employed passing through the registering sets of eyelets or any other preferred form of clip may be utilized.

It will be appreciated that the sail as a whole can thus be built up without sewing whatsoever; and a damaged or unsuitable sail cloth can be quickly changed for another without difficulty, and without having to repair or dismantle the whole sail.

*Battens.*—As shown in Figure 8 each batten carries at its end a roller or rollers 34 and a quick release catch 35. A rope can be threaded into the space between the arms of catches 35 so as to engage roller 34 and this rope is used for producing the requisite curvature of the sail in a manner to be described later.

The battens at their forward ends are constructed in Y formation so that at the mast end each batten terminates in two divergent arms 40. At the ends of these arms are secured brackets 41 each supporting a pair of rollers 42.

*Mast track.*—Each of the longitudinal members 21 is formed with a channel 43 which is substantially enclosed except for the opening through which the brackets 41 extend, the requisite clearance being provided between the sides of the channel openings and the brackets. In each channel 43 are two roller tracks 44 and 45 respectively, the track 45 being a V section track whereas track 44 is a plain track. The wheels 42 in each bracket are so mounted therein that one will engage a track 44 and the other a track 45 although the rollers are not necessarily in engagement with the tracks simultaneously. By providing the two tracks however it is ensured that, irrespective of the direction and pressure of the wind on the sail, a free rolling action of the rollers on the tracks is always afforded without binding.

The sail cloths are formed, in addition to any split selvedge such as that already described, with a V flare of double thickness to enclose within each of the double thicknesses one of the limbs 40 of the associated batten.

Figure 2:
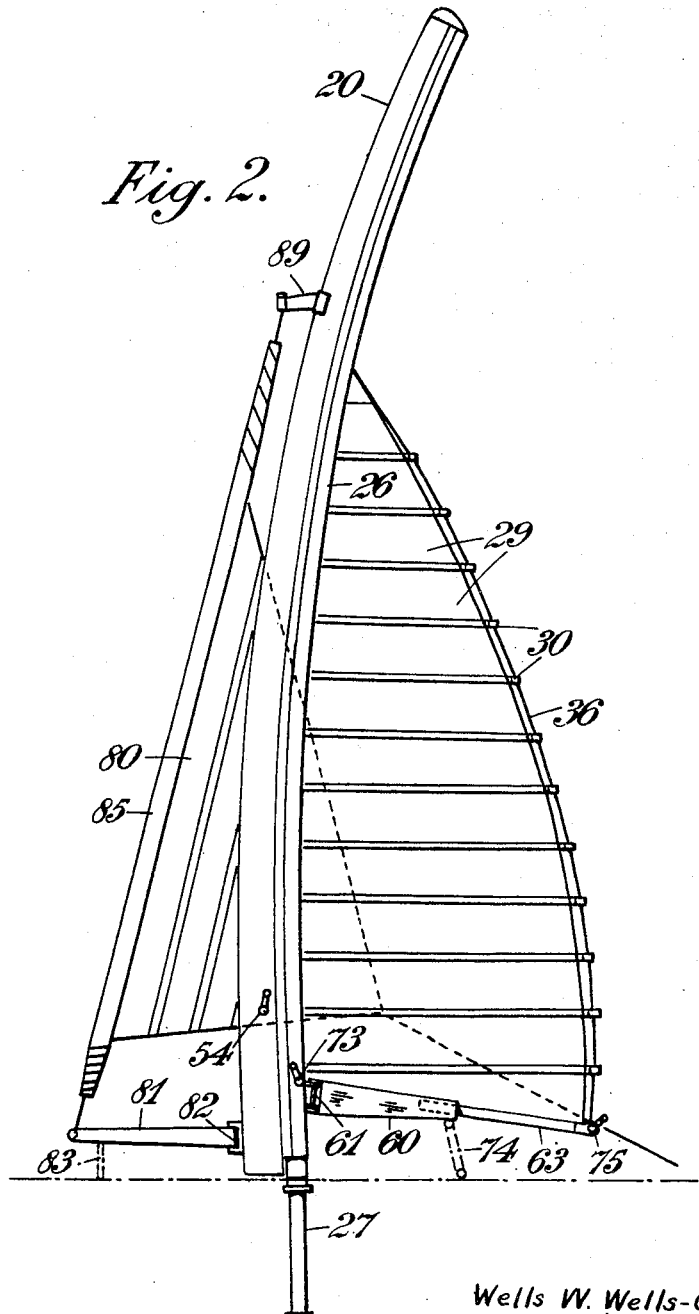
Figure 2 is a view similar to Figure 1 showing both sails in reefed condition.
Figure 3:
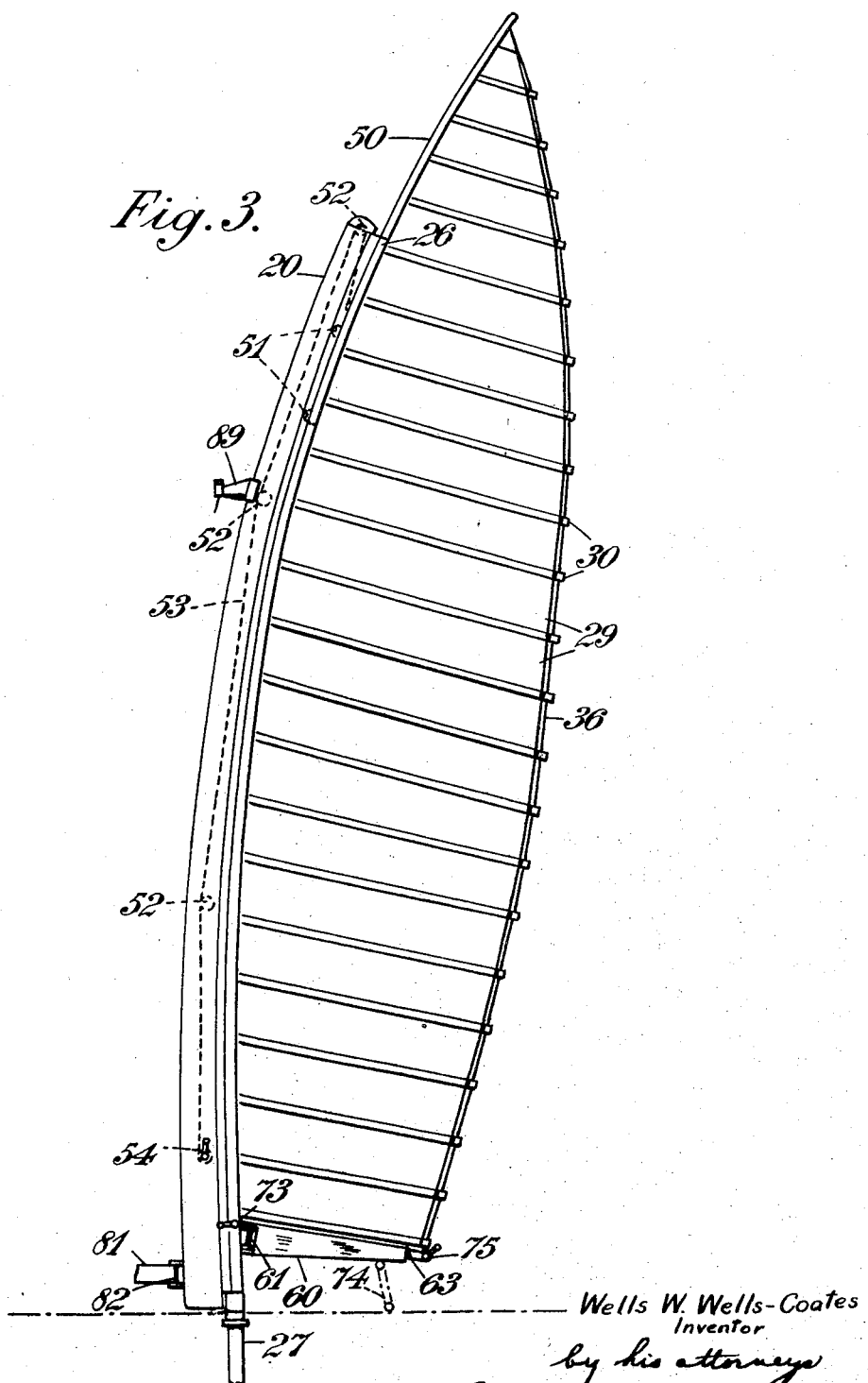
Figure 3 is a view similar to Figure 1 of a main sail provided with a gunter.

*Gunter.*—In Figures 1 and 2 the main sail is shown as being devoid of any rigid upper extension; but in Figures 3 and 4 the sail is shown as furnished with a gunter 50, and this member will be furnished with rollers as at 51 to run on the tracks 44 and 45 in a manner similar to that already described in connection with the batten rollers.

The mast is shown as smoothly and slightly curved aft from its base to its upper end and the gunter will be similarly curved.

Within the hollow forward portion of the mast rollers 52 are mounted to rotate about fixed pins, and over these rollers the main halyard 53 is guided and at its lower end is taken on to a winch 54 referred to in more detail below.

*Boom.*—In place of the usual single spar the boom is now of telescopic construction comprising (a) an outer sleeve-like member 60 pivotally mounted on a pin 61 supported in a two-armed bracket 62 secured to the mast near the foot thereof, and (b) an inner extensible member 63 guided to slide longitudinally within the outer member. Such a construction is diagrammatically illustrated in section in three different forms in Figures 9 to 11. While the actual means to guide the two parts in sliding relationship are not shown in detail it will be understood that the inner telescopic member 63, which is shown as formed in T section for strength, will be received in adequate guides in the outer member 60. The desirability of a boom of telescopic cross section is engendered by reason of the shape of the main sail and the desirability, whether the sail is reefed or non-reefed, for the free end of the boom to terminate substantially at the edge of the exposed portion of the sail. Thus with the sail fully extended as in Figure 1 or Figure 3 the boom will be fully telescoped whereas when the sail is reefed down as in Figures 2 and 4 the inner portion 63 will be drawn out to accommodate the increased fore and aft dimension of the sail at what, in its reefed condition, will be its lower edge.

*Stowage of main sail.*—To provide for stowage of the reefed portion of the sail, or for the whole of the sail when it is fully lowered, alternative means may be provided as shown for instance in Figures 9 to 11. In Figures 10 and 11 the reefed portion of the sail or the sail itself is shown as rolled up on the battens themselves either within the outer member 60 of the boom or within an additional bag 64 attached to and depending below the boom member 60. During stowage of the sail, the divergent arms 40 of the battens are closed together so as to enable the battens and the rollers thereon to be compactly rolled with the sail. When used as in Figure 11 a longitudinal slot is provided in the member 60 in order to allow the sail to enter into the interior of that part but in this form the boom will have to be of the necessary maximum length without the inner telescopic member 63.

As shown in Figure 10 however the telescopic boom can be used and an entrance slot is provided between one edge of bag 64 and the member 60.

In Figure 9 the sail is wound on to an auxiliary boom 65 spaced above the main boom member 60 and the actual winding of the sail on to the battens or on to the auxiliary boom 65 can be carried out by means of end fittings fixed flexibly or telescopically to the mast itself and to the clew of the sail. These attachments however are not illustrated in detail. Beneath the boom and extending the full length thereof there is preferably provided a flexible or hinged fin 66 which can rub over the deck surface at its lower edge and which will serve to close the gap between the boom and the deck.

*Control gear.*—The whole of the control gear for manipulating the sail and the mast is preferably provided by several winches which, in the form illustrated are intended to be ratchet winches but may be of any other preferred form. These winches are provided in the following manner and to fulfil the following adjustments:

1. A winch mounted on the deck may be furnished for rotating the mast about its longitudinal axis in order that it may present its most favourable aspect to the wind.

2. Boom and mast control: This is provided by means of a ratchet winch having a worm 70 and supported in a bracket 71 fixed in the mast structure and meshing with a toothed quadrant 72 carried by the forward end of the boom. Thus by rotating the worm 70 by means of the winch handles 73 the relative angle between the mast and the boom can be adjusted either to port or starboard.

3. Sheets: The boom is stepped down to the deck by means of a main sheet 74 and this sheet is conveniently operated by a ratchet winch not however shown in the drawings.

The mast is not necessarily operated by a winch and the control of the main sheet may be relied upon to control the combined movements of the mast and boom, these movements conforming to an enforced curvature of the sail by means of batten flexing gear.

4. Batten flexing gear: Although this may be provided in various forms it is conveniently effected by means of the leech rope 36 which passes over the rollers 34 at the ends of all the battens. This leech rope is rigidly connected at its upper end to the peak of the sail and at its lower end is taken down on to a winch 75 (Figure 6) so that a downhaul can be effected on leech rope 36 to any desired extent in order to flex the sail battens 30 to whatever degree is desired. Thus a curvature of the sail can be mechanically effected by the aid of the winch 75, leech rope 36 and battens 30 so as to produce a curvature best suited to the sailing conditions and not, as hitherto, dependent entirely upon the wind pressure, shape of the sail and the adjusted aspect thereof.

By the use of the worm and quadrant 70, 72 the boom can be swung, relatively to the mast, either to port or to starboard before the flexing of the battens occurs so that it is possible to create a curve or arch in the sail on either hand at will.

*Halyards.*—The main halyard as has already been stated, is operated from winch 54 so that by turning this winch in one direction or the other the sail can be either hoisted or lowered at will as is necessary.

So far the invention has been described in relation only to the main sail but it is to be understood that head sails of all kinds or a spinnaker may also be used as part of the complete rig of the vessel.

In the case of a head sail such for example as a foresail, the present invention includes an improvement by means of which the tack of the sail can be carried athwart ship beyond the midships position, either to port or to starboard. For this purpose, and as illustrated in Figures 1 to 4 and 19 and 20 the tack of the foresail 80 is anchored to the end of a strut 81 hinged to the mast at 82 and controlled by sheets 83 in order to position the strut 81 relatively to the fore and aft centre line of the vessel. The strut may be used in the midships position when required thus positioning the leading edge of the foresail in the usual position. In order however to effect the optimum position of the foresail relatively to the main sail and to the wind direction the strut 81 may be swung to any desired extent either to port, as in Figure 19 or to starboard as in Figure 20 from the midships position. In Figures 19 and 20 the wind direction for which adjustment of the strut 81 has been made is indicated by arrow 84.

The invention also includes the use of a roller or shell to which the leading edge of the sail is attached and which is itself of streamline section. This roller or shell is indicated in Figure 1 at 85 and two alternative forms thereof are shown in section on enlarged scales in Figures 16 and 17.

In the form shown in Figure 16 the shell 85 is streamlined and is intended to rotate about its longitudinal axis on a rod or the like 86. The foresail 80 can be reefed or completely rolled up by turning the shell 85 around its axis and in Figure 16 a partial reefing of the sail is indicated.

In the form shown in Figure 17 the foresail 80 enters the interior of shell 85 through a slot 87 extending throughout the whole or the major length of the shell and within the shell is a roller 88 to which the leading edge of the foresail is connected and on which the sail can be rolled so as to be contained within the shell 85.

When sailing "off" the wind a great increase in leeward pressure may be obtained by unrolling the foresail to its maximum extent and thereby overlapping the main sail. When sailing "on" the wind by shifting the tack of the foresail to leeward and at the same time, if required, shifting the clew of the main sheets to windward, a pattern of sails is presented into the wind which no existing known kind of rig can provide. The rigid arching of the main sail avoids flapping when luffed up into the wind.

The foresail tack may be shifted either to windward or leeward either by means of the strut or jib-boom illustrated or by means of a deck-horse or other fitting housed on the deck, of the vessel itself. The tack of the foresail will be led to the deck-horse or equivalent fitting and shifted athwartship by appropriate gear as desired.

The purpose of shifting the tack is to create the correct slot effect between it and the main sail and in the case of a large vessel it is preferred to use a deck-horse or the like rather than a strut or jib-boom.

While the main sail in general outline resembles a Bermudian sail it differs from this type in that at its lower portion the leech of the sail is cut away so that as it nears the deck it curves slightly forwardly as already described.

The peak of the foresail is preferably carried by a bracket 89 extending forwardly from the mast and the connection between the foresail and the bracket 89 is on a vertical centre line passing through the axis of rotation of the mast that is to say passing through the axis of rotation of shaft 27. Thus despite the curvature of mast 20 the position of the top of the peak of the foresail will remain unaltered as the mast is turned around its vertical axis.

Similar gear to that described above may be associated in another variant of the present invention, with a mast set in a tabernacle so that it may be lowered to the deck. In this version of the invention, the boom is attached to a vertical revolving member of the tabernacle, preferably in the form of a tube, and the worm gear and quadrant similar to 70, 72 will operate respectively off the tabernacle tube and the boom. The mast itself will be fixed to the tube by means of two brackets and pins arranged vertically above one another so that when the lowermost pin is removed the mast will swivel on the upper one so that it may be lowered with ease to the deck leaving the boom in situ attached to the tube.

The operation of the main sail is generally as follows. When the main sail is furled in the boom 60 and it is desired to raise it to its extended position, the winch 54 is turned to wind up the main halyard 53 which raises the main sail from its furled position in the boom 60. As the sail is raised the battens 30 follow along with it. The rollers 42 upon the divergent arms 40 of the battens are manually inserted in the channel 43 and the quick release catch 35 is engaged about the leech line 36. As each batten rises out of the boom member 60 these manual operations are carried out so that when the main sail is completely raised or extended all of the rollers 42 are in engagement with the proper surfaces of the channel 43 and the quick release catches are in engagement about the leech line 36. When the sail is raised to the desired position the battens 30 are bowed to the proper extent by tightening the leech line 36 through the winch 75. When the leech line is tightened it tends to approach a straight line from the top of the mast to the winch 75 and accordingly causes the battens to bow forming a controlled arch in the sail.

I claim:

1. A fore-and-aft sail rig for a marine vessel comprising in combination, a mast, a flexible main sail capable of being arched as a whole over substantially its full area, a plurality of resilient battens fixed at different heights to the sail and extending from the leech to the luff thereof, each said batten being capable of flexure to bowed formation laterally of the sail over a substantial portion of its length, a leech line for controlling and maintaining arching of the sail, and guide means at the free ends of the battens adjacent the leech for receiving the leech line, said leech line and its guides being disposed in a path which is bowed towards the mast, whereby hauling on the leech line tends to straighten the leech and thereby exert a thrust along the battens for flexing them to produce arching of the sail.

2. A fore-and-aft sail rig for a marine vessel comprising in combination, a mast of aerofoil cross section, a flexible main sail capable of being arched as a whole over substantially its full area, a plurality of resilient battens fixed at different heights to the sail and extending from the leech to the luff thereof, each said batten being capable of flexure to bowed formation laterally of the sail over a substantial portion of its length, a leech line for controlling and maintaining arching of the sail, and guide means at the free ends of the battens adjacent the leech for receiving the leech line, said leech line and its guides being disposed in a path which is bowed towards the mast, whereby hauling on the leech line tends to straighten the leech and thereby exert a thrust along the battens for flexing them to produce arching of the sail.

3. A fore-and-aft sail rig for a marine vessel comprising in combination, a mast rotatably mounted about a substantially vertical axis, a flexible main sail capable of being arched as a whole over substantially its full area, a plurality of resilient battens fixed at different heights to the sail and extending from the leech to the luff thereof, each said batten being capable of flexure to bowed formation laterally of the sail over a substantial portion of its length, a leech line for controlling and maintaining arching of the sail, and guide means at the free ends of the battens adjacent the leech for receiving the leech line, said leech line and its guides being disposed in a path which is bowed towards the mast, whereby hauling on the leech line tends to straighten the leech and thereby exert a thrust along the battens for flexing them to produce arching of the sail.

4. A fore-and-aft sail rig for a marine vessel comprising in combination, a mast, a flexible main sail capable of being arched as a whole over substantially its full area, flaps extending from the mast on both sides of the sail to close the gap between the mast and the luff of the sail, a plurality of resilient battens fixed at different heights to the sail and extending from the leech to the luff thereof, each said batten being capable of flexure to bowed formation laterally of the sail over a substantial portion of its length, a leech line for controlling and maintaining arching of the sail, and guide means at the free ends of the battens adjacent the leech for receiving the leech line, said leech line and its guides being disposed in a path which is bowed towards the mast, whereby hauling on the leech line tends to straighten the leech and thereby exert a thrust along the battens for flexing them to produce arching of the sail.

5. A fore-and-aft sail rig for a marine vessel comprising in combination, a mast of aerofoil cross section, a flexible main sail capable of being arched as a whole over substantially its full area, flaps of resilient material extending from the mast on both sides of the sail to close the gap between the mast and the luff of the sail, the mast and flaps constituting as a whole a streamlined structure, a plurality of resilient battens fixed at different heights to the sail and extending from the leech to the luff thereof, each said batten being capable of flexure to bowed formation laterally to the sail over a substantial portion of its length, a leech line for controlling and maintaining arching of the sail, and guide means at the free ends of the battens adjacent the leech for receiving the leech line, said leech line and its guides being disposed in a path which is bowed towards the mast, whereby hauling on the leech line tends to straighten the leech and thereby exert a thrust along the battens for flexing them to produce arching of the sails.

6. A fore-and-aft sail rig for a marine vessel comprising in combination, a mast of aero-foil cross section, a flexible main sail capable of being arched as a whole over substantially its full area, a plurality of resilient battens fixed at different heights to the sail and extending from the leech to the luff thereof, each batten being constructed at its forward end adjacent the mast with two divergent arms extending beyond the luff of the sail and carrying rollers to engage the mast and hold the forward end of the batten against lateral movement relatively to the mast, each batten being capable of flexure to bowed formation laterally of the sail over a substantial portion of its length, a leech line for controlling and maintaining arching of the sail, and guide means at the free ends of the battens adjacent the leech for receiving the leech line, said leech line and its guides being disposed in a path which is bowed towards the mast, whereby hauling on the leech line tends to straighten the leech and thereby exert a thrust along the battens for flexing them to produce arching of the sail.

7. A fore-and-aft sail rig for a marine vessel comprising in combination, a mast of aero-foil cross section, a flexible main sail capable of being arched as a whole over substantially its full area, a plurality of resilient battens fixed at different heights to the sail and extending from the leech to the luff thereof, each batten being constructed at its forward end adjacent the mast with two divergent arms extending beyond the luff of the sail and carrying rollers to engage the mast and hold the forward end of the batten against lateral movement relatively to the mast, the sail cloth of the sail being furnished at the forwardly directed edge with a V-flare to accommodate and enclose the divergent arms of the battens, and each batten being capable of flexure to bowed formation laterally of the sail over a substantial portion of its length, a leech line for controlling and maintaining arching of the sail, and guide means at the free ends of the battens adjacent the leech for receiving the leech line, said leech line and its guides being disposed in a path which is bowed towards the mast, whereby hauling on the leech line tends to straighten the leech and thereby exert a thrust along the battens for flexing them to produce arching of the sail.

8. A fore-and-aft sail rig for a marine vessel comprising in combination, a mast, a flexible main sail capable of being arched as a whole over substantially its full area, a telescopic boom for the main sail, a plurality of resilient battens fixed at different heights to the sail and extending from the leech to the luff thereof, each said batten being capable of flexure to bowed formation laterally of the sail over a substantial portion of its length, a leech line for controlling and maintaining arching of the sail, and guide means at the free ends of the battens adjacent the leech for receiving the leech line, said leech line and its guides being disposed in a path which is bowed towards the mast, whereby hauling on the leech line tends to straighten the leech and thereby exert a thrust along the battens for flexing them to produce arching of the sail.

9. A fore-and-aft sail rig for a marine vessel comprising in combination, a mast, a flexible main sail capable of being arched as a whole over substantially its full area, a telescopic boom for the main sail, a plurality of resilient battens fixed at different heights to the sail and extending from the leech to the luff thereof, each said batten being capable of flexure to bowed formation laterally of the sail over a substantial portion of its length, a leech line for controlling and maintaining arching of the sail, said leech line being connected at its upper end to the peak of the sail and at its lower end to a winch on a boom for the sail for effecting a down-haul on the leech line, and guide slots at the free ends of the battens remote from the mast and adjacent the leech for slidably receiving the leech line, said leech line and its guides being disposed in a path which is bowed towards the mast whereby hauling on the leech line by the winch on the boom tends to straighten the leech and thereby exert a thrust along the battens for flexing them to produce arching of the sail.

10. A fore-and-aft sail rig for a marine vessel comprising in combination, a mast of aero-foil across section, a flexible main sail capable of being arched as a whole over substantially its full area, a telescopic boom for the said main sail, said boom incorporating a hollow portion for stowage of the rolled-up sail, a plurality of resilient battens fixed at different heights to the sail and extending from the leech to the luff thereof, each said batten being capable of flexure to bowed formation laterally of the sail over a substantial portion of its length, a leech line for controlling and maintaining arching of the sail, and guide means at the free ends of the battens adjacent the leech for receiving the leech line, said leech line and its guides being disposed in a path which is bowed towards the mast, whereby hauling on the leech line tends to straighten the leech and thereby exert a thrust along the battens for flexing them to produce arching of the sail.

WELLS WINTEMUTE WELLS-COATES.

REFERENCES CITED

The following references are of record in the file of this patent:

UNITED STATES PATENTS

| Number | Name | Date |
|---|---|---|
| 235,868 | Gondie | Dec. 28, 1880 |
| 239,905 | Wilson | Apr. 5, 1881 |
| 507,052 | Voss | Oct. 17, 1893 |
| 639,916 | Achterberg | Dec. 26, 1899 |
| 1,613,890 | Herreshoff | Jan. 11, 1927 |
| 1,700,660 | Williams | Jan. 29, 1929 |
| 2,077,685 | Gerhardt | Apr. 20, 1937 |
| 2,107,303 | Ljungstrom | Feb. 8, 1938 |
| 2,484,687 | Carl | Oct. 11, 1949 |

FOREIGN PATENTS

| Number | Country | Date |
|---|---|---|
| 19,279 | Great Britain | 1908 |
| 293,226 | Germany | July 22, 1916 |
| 611,838 | France | July 19, 1926 |